United States Patent [19]

Frick

[11] Patent Number: 5,483,834
[45] Date of Patent: Jan. 16, 1996

[54] SUSPENDED DIAPHRAGM PRESSURE SENSOR

[75] Inventor: Roger L. Frick, Hackensack, Minn.

[73] Assignee: Rosemount Inc., Eden Prairie, Minn.

[21] Appl. No.: 123,729

[22] Filed: Sep. 20, 1993

[51] Int. Cl.⁶ ..................................................... G01L 9/12
[52] U.S. Cl. .................. 73/724; 73/726; 73/718; 73/720; 338/4
[58] Field of Search ................................ 361/283.1, 283.3, 361/283.4; 338/4, 42; 73/718, 720, 729.2, 731, 724, 726

[56] References Cited

U.S. PATENT DOCUMENTS

| | | | |
|---|---|---|---|
| D. 317,266 | 6/1991 | Broden et al. | D10/46 |
| 2,420,148 | 5/1947 | Ostergren | 338/4 |
| 3,686,958 | 8/1972 | Porter et al. | 73/731 |
| 4,208,782 | 6/1980 | Kurtz et al. | 29/580 |
| 4,236,137 | 11/1980 | Kurtz et al. | 338/4 |
| 4,276,533 | 6/1981 | Tominaga et al. | 338/4 |
| 4,398,194 | 8/1983 | Johnston | 361/283.3 |
| 4,443,293 | 4/1984 | Mallon et al. | 156/647 |
| 4,479,070 | 10/1984 | Frische et al. | 310/338 |
| 4,578,735 | 3/1986 | Knecht et al. | 361/283 |
| 4,586,108 | 4/1986 | Frick | 361/283 |
| 4,603,371 | 7/1986 | Frick | 361/283 |
| 4,612,599 | 9/1986 | Ziegler | 361/283 |
| 4,625,559 | 12/1986 | Carter et al. | 73/706 |
| 4,790,192 | 12/1988 | Knecht et al. | 73/721 |
| 4,800,758 | 1/1989 | Knecht et al. | 73/727 |
| 4,829,825 | 5/1989 | Lawford | 73/729.9 |
| 4,833,922 | 5/1989 | Frick et al. | 73/756 |
| 4,974,117 | 11/1990 | Irwin | 361/283 |
| 4,993,754 | 2/1991 | Templin, Jr. | 285/189 |
| 5,005,421 | 4/1991 | Hegner et al. | 73/72 |
| 5,008,774 | 4/1991 | Bullis et al. | 361/283 |
| 5,022,270 | 6/1991 | Rud, Jr. | 73/706 |
| 5,024,098 | 6/1991 | Petitjean et al. | 73/729 |
| 5,081,867 | 1/1992 | Yamada | 73/517 R |
| 5,083,091 | 1/1992 | Frick et al. | 324/678 |
| 5,094,109 | 3/1992 | Dean et al. | 73/718 |
| 5,095,755 | 3/1992 | Peterson | 73/706 |
| 5,157,972 | 10/1992 | Broden et al. | 73/718 |
| 5,157,973 | 10/1992 | Ciminelli | 73/718 |
| 5,201,228 | 4/1993 | Kojima et al. | 73/724 |
| 5,214,961 | 6/1993 | Kojima et al. | 73/715 |
| 5,233,875 | 8/1993 | Obermeier et al. | 73/718 |
| 5,349,492 | 9/1994 | Kimura et al. | 361/283.4 |

FOREIGN PATENT DOCUMENTS

| | | |
|---|---|---|
| 0086737A1 | 8/1983 | European Pat. Off. . |
| 474280A2 | 3/1992 | European Pat. Off. .......... G01L 9/00 |
| 0521246A2 | 1/1993 | European Pat. Off. . |
| WO93/2264 | 11/1993 | European Pat. Off. . |
| 4244450A1 | 7/1983 | Germany . |
| 3839515A1 | 6/1989 | Germany . |
| 4111118A1 | 10/1992 | Germany .......................... G01L 9/12 |
| 4127460A1 | 2/1993 | Germany . |

OTHER PUBLICATIONS

Nova Sensor—Silicon Sensors and Microstructure, "Creep of Sensor's Elastic Elements: Metals Versus Non–metals", K. Bethe, D. Baumgarten and J. Frank, Jun. 1990, pp. 844–849.

Nova Sensor "Silicon Sensors and Microstructure", pp. 5.4–5.8, 8.21–8.23, 9.9–9.10, 9.13–9.15.

"Sapphire Transducer Works Under Pressure," *Machine Deesign*, vol. 59, No. 3, Feb. 12, 1987, p. 72.

Primary Examiner—Richard E. Chilcot, Jr.
Assistant Examiner—Joseph L. Felber
Attorney, Agent, or Firm—Westman, Champlin & Kelly

[57] ABSTRACT

A pressure sensor includes a diaphragm assembly with a pair of diaphragms joined together along a rim and having spaced apart centers to form a cavity between them. A pressure input applies a pressurized fluid to external surfaces of the diaphragms. The diaphragm assembly is connected to a mounting block along a tab leaving the remainder of the diaphragm free from solid mounting. Deflection of the diaphragm assembly is sensed and is related to applied pressure.

26 Claims, 5 Drawing Sheets

5,483,834

1
SUSPENDED DIAPHRAGM PRESSURE SENSOR

BACKGROUND OF THE INVENTION

The present invention relates to a pressure sensor. In particular, the invention relates to a diaphragm pressure sensor which is suspended to provide stress isolation.

The prior art shows various solid state pressure sensors which have a deflectable diaphragm for sensing pressure. Some are capable of being formed by batch processing. It is desirable to have solid state pressure sensors made of relatively rigid materials, such as semiconductor materials, and yet have them "hard mounted" which means that they have a mounting surface non-resiliently mounted onto a supporting surface. It is also desirable to have the sensing element completely surrounded by the fluid pressure being measured and to have the entire sensor and supporting structure constructed of the same material. This type of construction will minimize errors caused by line pressure variations. In other words, the sensor will respond to differential pressure but be insensitive to changes in common pressure. During operation, such sensors are frequently subjected to strain from external sources. Difficulty has been encountered in minimizing the effects of external strain on the support surface, which is a source of unwanted stress on the measuring diaphragm. This provides false or inaccurate pressure readings. U.S. Pat. No. 4,612,599, issued Sep. 16, 1986, entitled "Capacitive Pressure Sensor," shows a pressure sensor formed with silicon. U.S. Pat. No. 4,800,758, issued Jan. 3, 1989, entitled "Pressure Transducer with Stress Isolation for Hard Mounting" describes a batch fabricated pressure sensor with stress isolation.

SUMMARY OF THE INVENTION

The present invention provides improved isolation in a batch fabricated suspended diaphragm pressure sensor and provides improved accuracy when static pressure variations are present. A diaphragm assembly includes a pair of diaphragms joined to one another along a rim. The diaphragms have centers which are spaced apart from one another to form a cavity between them. Sensing means is carried on at least one of the diaphragms for sensing its deflection and providing an output. As pressure is applied to external surfaces of the diaphragm assembly, the cavity changes in size and the diaphragms are deflected. This deflection is representative of applied pressure. The diaphragm assembly is mounted to a mounting block by a tab connected to the rim which leaves the cavity and remaining portion of the rim free of further solid mounting.

2

Figure 6:
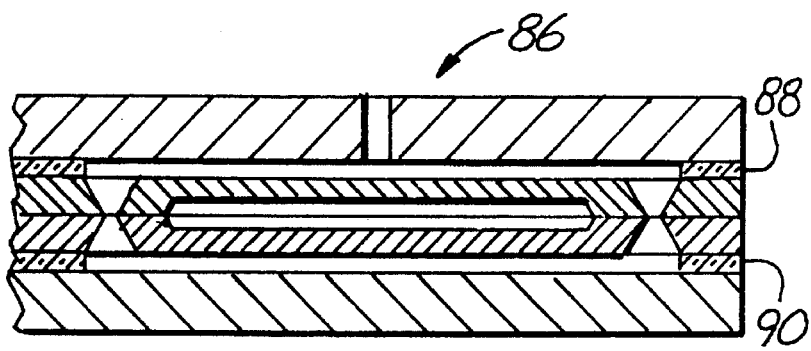

FIG. 6 is a cross-sectional view of a suspended diaphragm pressure sensor in accordance with another embodiment of the present invention.

Figure 7:
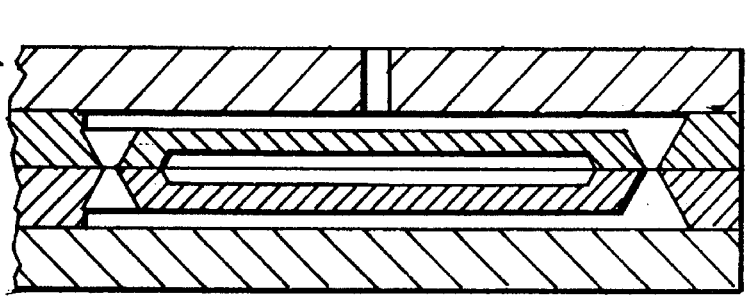

FIG. 7 is a cross-sectional view of a suspended diaphragm pressure sensor in accordance with another embodiment of the present invention.

Figure 8:
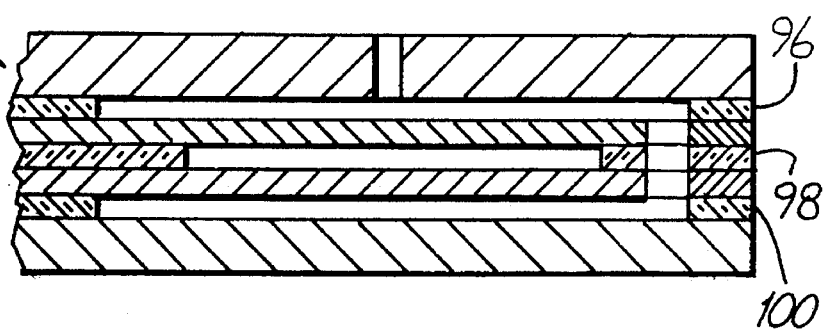

FIG. 8 is a cross-sectional view of a suspended diaphragm pressure sensor in accordance with another embodiment of the present invention.

Figure 9:
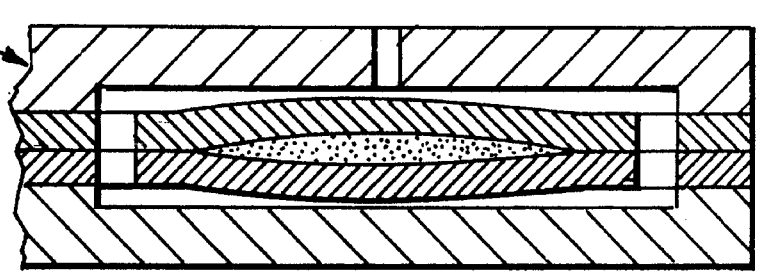

FIG. 9 is a cross-sectional view of a suspended diaphragm pressure sensor in accordance with another embodiment of the present invention.

Figure 10:
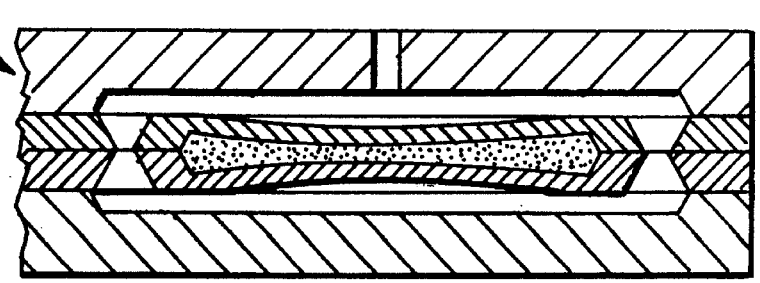

FIG. 10 is a cross-sectional view of a suspended diaphragm pressure sensor in accordance with another embodiment of the present invention.

Figure 11:
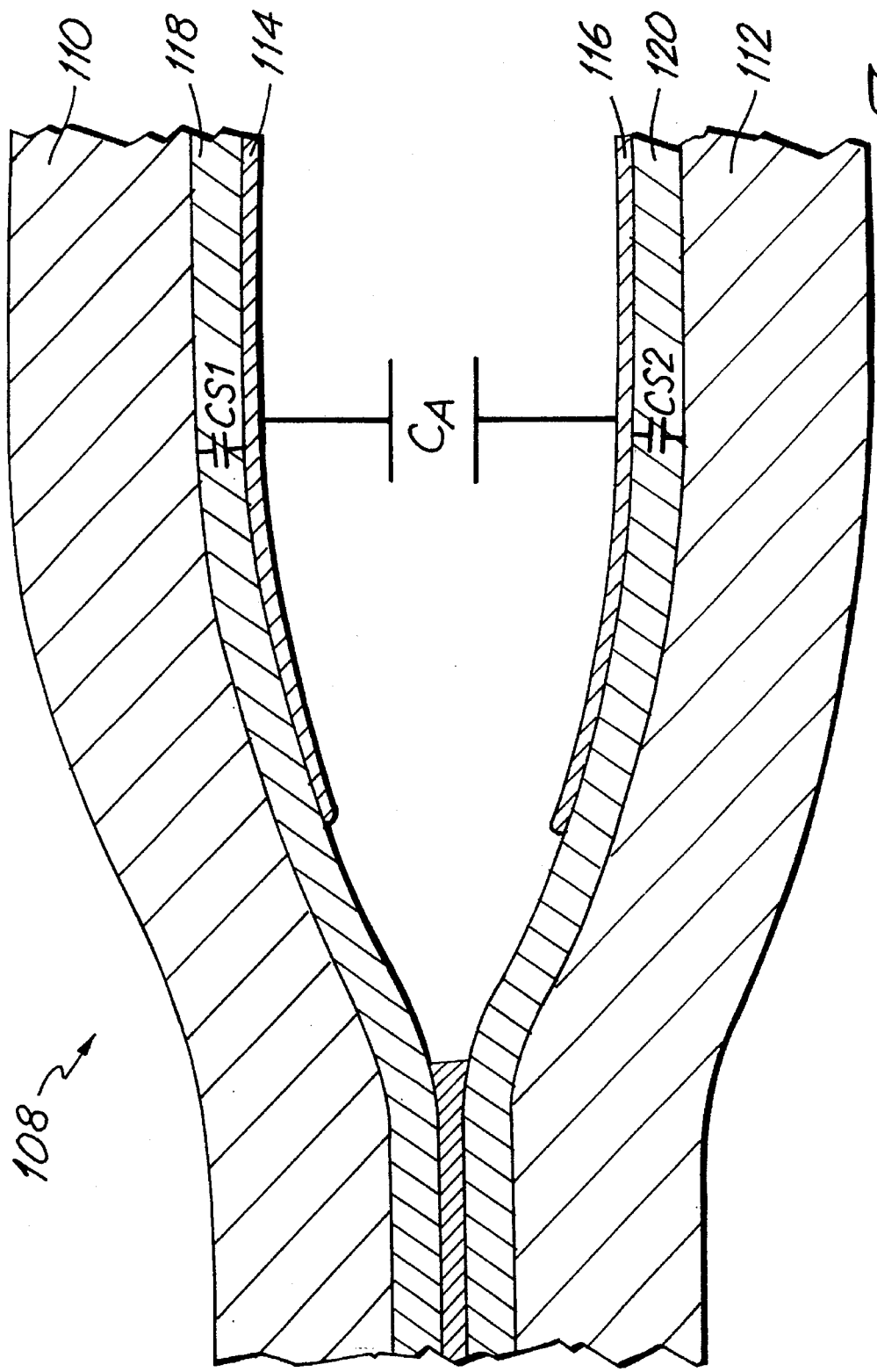

FIG. 11 is a cross-sectional view of a diaphragm pair in accordance with the present invention showing system electrical capacitance.

FIG. 12 is a schematic diagram of guard capacitance circuitry.

DETAILED DESCRIPTION OF THE PREFERRED EMBODIMENTS

The pressure sensor layers of the present invention are made using batch fabrication techniques. A silicon wafer or layer is etched in a conventional manner to form the desired features and is then formed into a sandwich construction with additional layers of suitable material to form the sensor. After forming the wafers or layers, they are cut up into individual sensors. Such batch fabricating techniques in general are desirable. The processing techniques presently known include the ability to bond together glass, insulators, metals, semiconductors such as silicon and other suitable semiconductors or sapphire either by anodic bonding, fusion bonding or using materials with a glass frit. Suitable epoxies or other types of bonding materials can also be used. In discussing the bonding of layers of materials together, specific forms of bonding will not necessarily be mentioned, but include the known forms described above.

Further the formation of thinner diaphragm sections in a silicon wafer, with integral rims around the diaphragm edges, involves well-known etching techniques. The formation of openings and necks surrounding openings in such wafers by etching or other known techniques is within the skill of the art.

Figure 1:
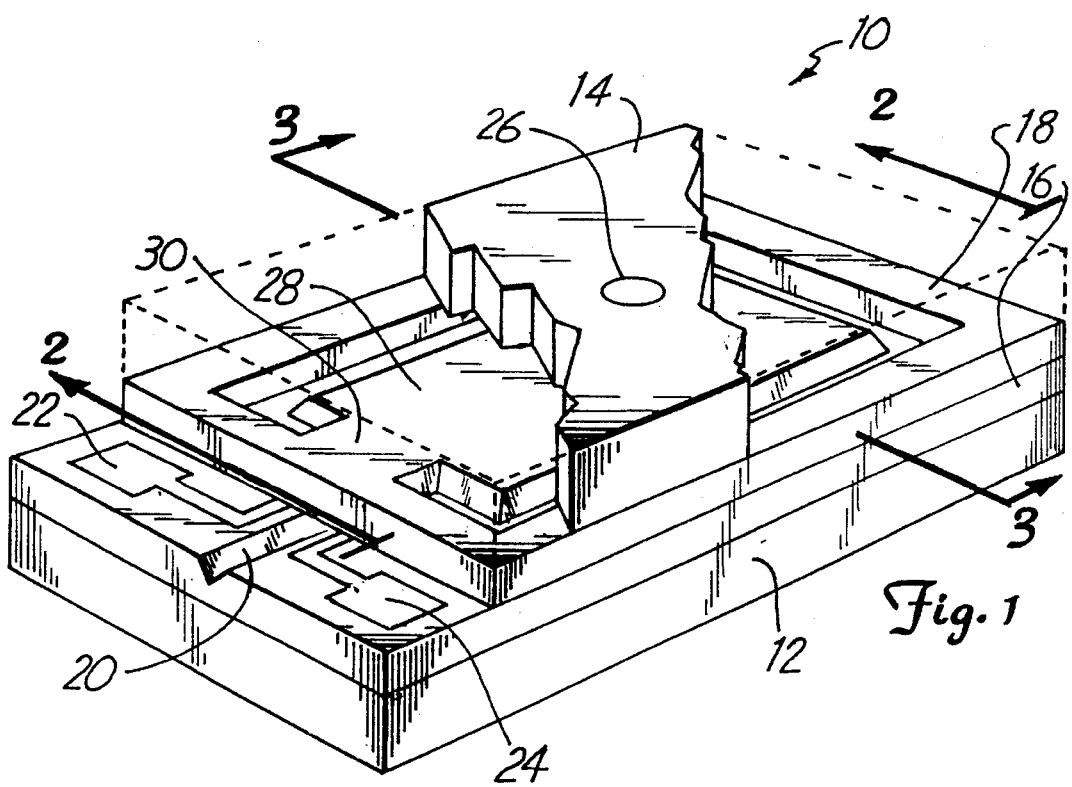
FIG. 1 is a perspective fragmentary view of a suspended diaphragm pressure sensor in accordance with the present invention.

FIG. 1 is a perspective fragmentary view of suspended diaphragm pressure sensor 10 in accordance with the present invention. Suspended diaphragm pressure sensor 10 includes lower substrate 12 and upper substrate 14. Lower diaphragm substrate 16 is bonded to lower substrate 12, and upper diaphragm substrate 18 is bonded to upper substrate 14. Lower diaphragm substrate 16 and upper diaphragm substrate 18 are bonded together. Lower diaphragm substrate 16 carries channel 20 and electrical contacts 22 and 24. Pressure inlet 26 extends through upper substrate 14. Upper diaphragm substrate 18 includes upper diaphragm 28 carried by support tab 30.

Figure 2:
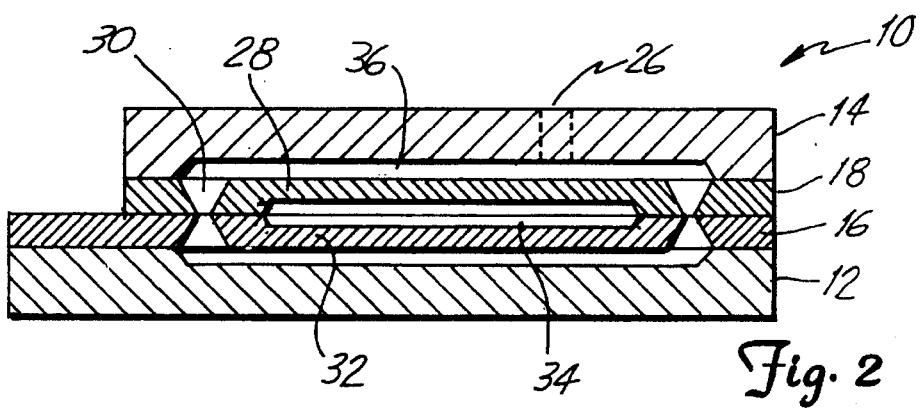
FIG. 2 is a cross-sectional view of FIG. 1 taken along the line labeled 2—2.
Figure 3:
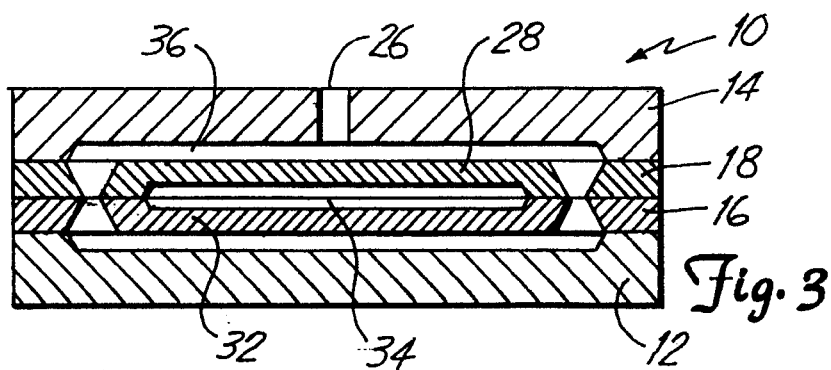
FIG. 3 is a cross-sectional view of FIG. 1 taken along the line labeled 3—3.

FIG. 2 is a cross-sectional view of suspended diaphragm pressure sensor 10 taken along the line labeled 2—2 in FIG. 1. FIG. 3 is a cross-sectional view of suspended diaphragm pressure sensor 10 taken along the line labeled 3—3 in FIG. 1. FIGS. 2 and 3 show lower diaphragm 32 coupled to upper diaphragm 28. Upper diaphragm 28 and lower diaphragm 32 form a diaphragm assembly having diaphragm cavity 34 which typically containing a reference pressure applied through channel 20. Upper and lower diaphragms 28 and 32 are joined along their rims. Upper diaphragm 28 and lower diaphragm 32 are suspended in pressure input cavity 36 which is coupled to pressure inlet 26.

In operation, suspended diaphragm pressure sensor is used to sense the difference in pressure between cavity 34 and cavity 36. Diaphragm cavity 34 expands and contracts inside pressure input cavity 36 in response to pressure applied through pressure inlet 26. This causes upper diaphragm 28 and lower diaphragm 32 to bend inward into diaphragm cavity 34 or to deflect outward away from diaphragm cavity 34. Fluid flows into cavity 34 or out of cavity 34 via channel 20 which extends through tab 30. Deflection of diaphragms 28 and 32 (and therefore applied pressure) is detected with electrical contacts 22 and 24. These contacts are coupled to sensors carried on diaphragms 28 and 32. In one embodiment, these sensors are capacitive plates or metallizations. Diaphragm 28 carries a capacitive plate and diaphragm 32 carries a capacitive plate. The capacitance between these two plates changes as they are displaced due to applied pressure through inlet 26. In another embodiment, electrical contacts 22 and 24 are coupled to a strain gage on a diaphragm which changes resistance as diaphragms 28 and 32 are deformed.

As shown in FIGS. 1 through 3, the diaphragm assembly which detects pressure (diaphragms 28 and 32, and cavity 34) is substantially stress isolated from substrates 12 and 16 which are the support structure. This is because the diaphragm assembly formed by diaphragms 28 and 32 is coupled to the surrounding support structure solely through tab 30. This greatly reduces any deformation of diaphragms 28 and 32 caused by stress applied to substrates 12 and 14. This improves the accuracy of pressure measurements and reduces the size of cavity 34 required to obtain pressure readings of the desired accuracy. The invention provides another advantage in that if an overpressure is applied which exceeds the measurement range of suspended diaphragm pressure sensor 10, sensor 10 is not damaged because diaphragms 28 and 32 collapse together but do not rupture. Under overpressure conditions, the material in the central areas of the diaphragms is in compression rather than tension. Brittle materials such as silicon tend to have great strength in compression, but are weak in tension. Additionally, the invention requires a relatively small oil fill volume for operation, which also provides improved accuracy.

In a preferred embodiment, suspended diaphragm pressure sensor 10 is formed of brittle materials such as single crystal silicon or sapphire materials and batch fabricated. These materials provide improved accuracy because of reduced hysteresis and improved dimension stability. Furthermore, materials such as silicon, ceramic and glass, are easily batch fabricated using known fabrication techniques.

Figure 4:
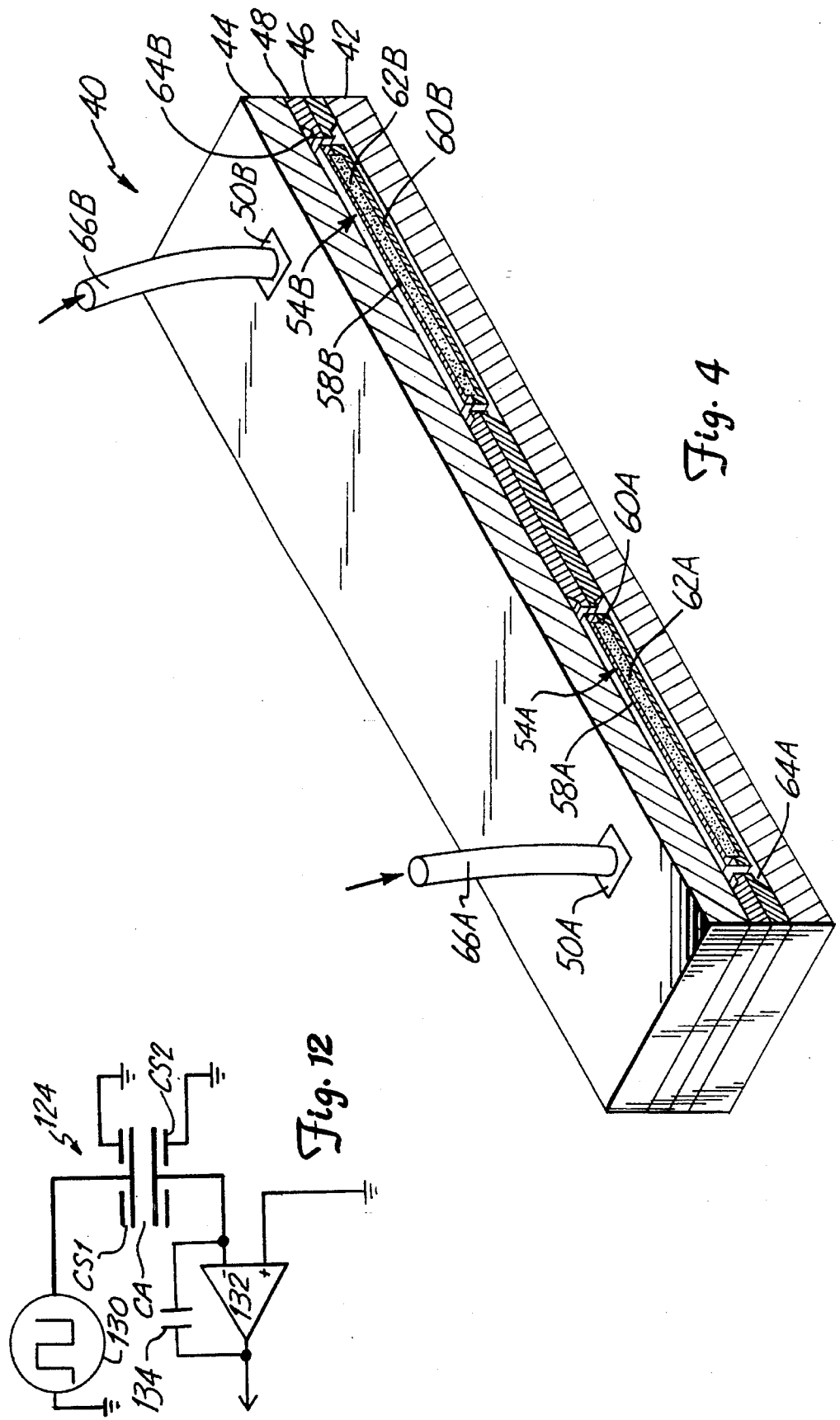
FIG. 4 is a cross-sectional perspective view of a differential pressure sensor in accordance with the present invention.

FIG. 4 is a perspective cross-sectional view of suspended diaphragm differential pressure sensor 40 in accordance with the present invention. Sensor 40 is formed by placing a pair of pressure sensors similar to pressure sensor 10, shown in FIG. 1, together having a channel (not shown in FIG. 4) such as channel 20 in FIG. 1 extending between the diaphragm assemblies.

Differential pressure sensor 40 includes lower substrate 42, upper substrate 44, lower diaphragm substrate 46 and upper diaphragm substrate 48. Differential pressure is applied via pressure inlets 50A and 50B. Pressure inlets 50A and 50B are coupled to diaphragm assemblies 54A and 54B, respectively. Diaphragm assembly 54A includes upper diaphragm 58A and lower diaphragm 60A which form diaphragm cavity 62A. Diaphragm cavity 62A is carried in pressure inlet cavity 64A which is coupled to pressure inlet 50A. The structure of diaphragm assembly 54B is similar to that of diaphragm assembly 54A.

In differential pressure sensor 40, diaphragm cavity 62A is coupled to diaphragm cavity 62B through a channel not shown in FIG. 4 but which is similar to channel 20 shown in FIG. 1. The channel connecting cavities 62A and 62B extends through tabs that support diaphragm assemblies 54A and 54B within cavities 64A and 64B, respectively. Cavities 62A and 62B are filled with a sealed-in quantity of a relatively incompressible fluid so that as one cavity expands due to applied pressure the other cavity contracts.

Figure 5:
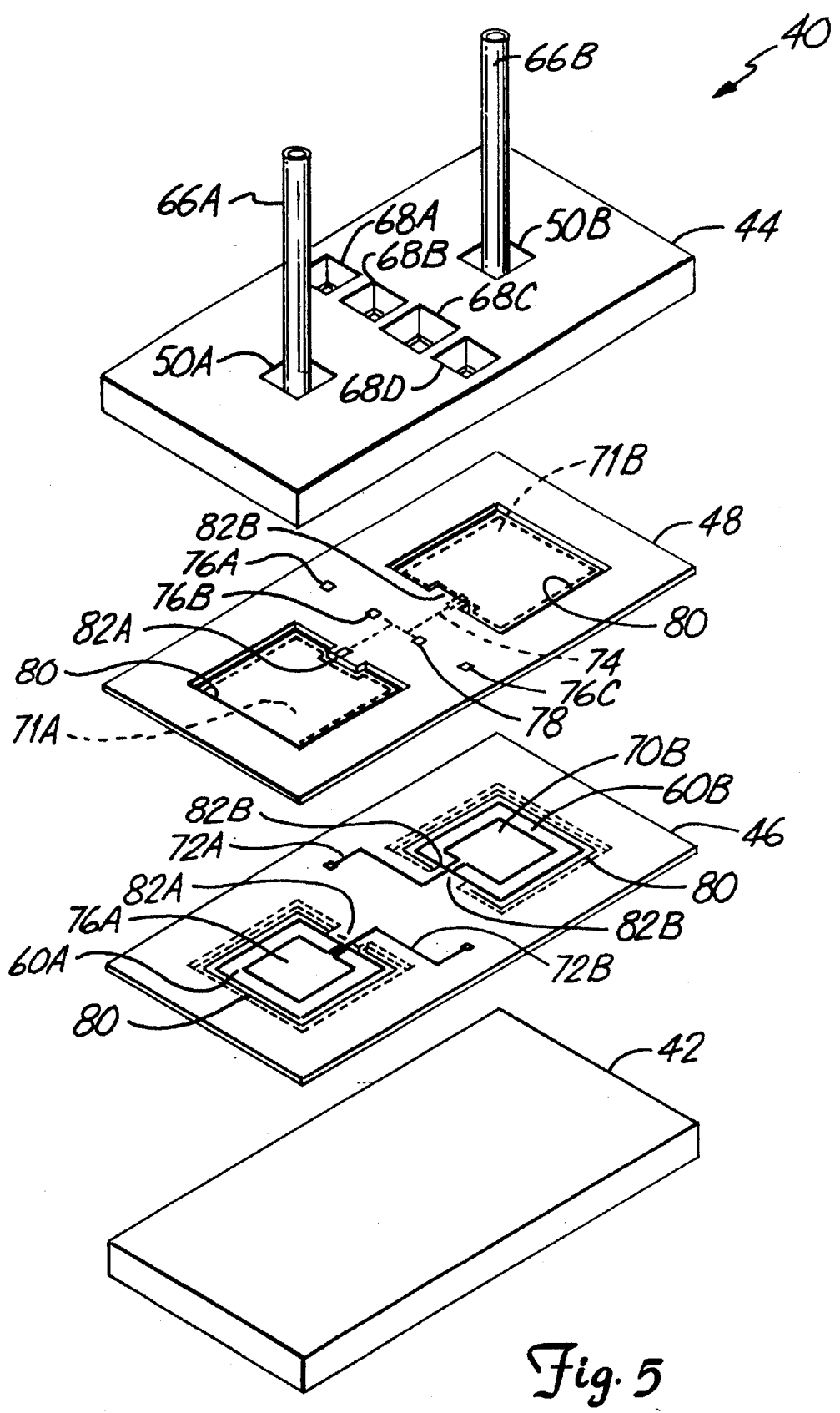
FIG. 5 is an exploded perspective view of the differential pressure sensor of FIG. 4.

FIG. 5 is an exploded view of differential pressure sensor 40. FIG. 5 shows pressure tubes 66A and 66B coupled to pressure inlets 50A and 50B. Upper substrate includes access holes 68A, 68B, 68C and 68D which are not shown in FIG. 4. Access holes 68A, 68B, and 68D are used to electrically contact the diaphragm assemblies and access hole 68C is for oil fill of diaphragm cavities 62A and 62B.

Lower diaphragm substrate 46 includes capacitor plates 70A and 70B carried on lower diaphragm 60A and 60B and coupled to conductors 72A and 72B, respectively. Upper diaphragm substrate 48 includes electrical contacts 76A, 76B and 76C. Contact 76A couples to conductor 72A, and contact 76C couples to conductor 72B. Contact 76B couples to a conductive trench 74 which is shown by a dashed line on substrate 48. Conductive trench 74 is electrically coupled to capacitive plates 71A and 71B carried on the under side of upper diaphragms 58A and 58B, which are shown in dashed lines in FIG. 5. Additionally, trench 74 provides fluid communication between diaphragm cavities 62A and 62B and oil fill inlet 78. Substrates 46 and 48 also include laser cut paths 80 which define the edges of upper diaphragms 58A and 58B and lower diaphragms 60A and 60B.

During fabrication, substrates 42, 44, 46 and 48 are formed using standard batch fabrication etching and masking techniques. Capacitive plates 70A and 70B, and 71A and 71B, are deposited on diaphragms 60A and 60B, and 58A and 58B, respectively. Diaphragms 58A, 58B, 60A and 60B are formed by etching away the back sides (the side which is exposed to cavities 64A and 64B) of the diaphragms to provide a more flexible diaphragm membrane. Substrates 46 and 48 are joined together such that a fluid tight bond is formed. This bond also bonds the rim of diaphragm 58A to the rim of diaphragm 60A, and the rim of diaphragm 58B to the rim of diaphragm 60B. The "rim" is the region of the diaphragm which is just beyond the edges of capacitive plates 70A, 70B, 71A, and 71B. Following the bonding step, diaphragm assemblies 54A and 54B are freed from substrates 46 and 48 by drilling a path along laser cut path 80 with a laser, except around support tabs 82A and 82B such that diaphragm assemblies 54A and 54B are coupled to substrates 46 and 48 by support tabs 82A and 82B. Following the bonding together of substrates 46 and 48, substrates 42 and 44 are bonded to substrates 46 and 48, respectively. The bonding occurs everywhere except in the recessed regions 62A and 62B which define diaphragms 58A, 58B, 60A and 60B. These recesses are made as small as possible so that stress during overload is minimized. Recessed regions 62A 62B typically have a thickness of about 0.1 mils.

After substrates 42 through 48 are bonded together, diaphragm assemblies 54A and 54B are preferably oil filled. Oil fill is through access hole 68C which is coupled to oil fill inlet 78, trench 74, and diaphragm cavities 62A and 62B. Pressurized oil is injected through inlet 78 to fill cavities 62A and 62B. Inlet 78 is then sealed to prevent escape of oil. In one embodiment, inlet 78 is sealed by a gold plug inserted into hole 68C.

In one embodiment, substrates 42 and 44 are about 50 mils and substrates 46 and 48 are about 10 mils. The finished sensor dimensions are 350 mils wide, 700 mils long and 115 mils thick.

FIGS. 6, 7, 8, 9 and 10 show cross-sectional views of a number of alternative diaphragm configurations in accordance with the invention. FIG. 6 shows suspended diaphragm pressure sensor 86 which includes spacing layers 88 and 90. Spacing layers 88 and 90 are used to separate the outer substrate layers from the diaphragm assembly. FIG. 7 shows suspended diaphragm sensor 92 in which the outer substrates have not been etched to provide room for the diaphragm assembly. The arrangement shown in FIG. 7 is one of the preferred embodiments. FIG. 8 shows suspended diaphragm pressure sensor 94 in which spacing layers 96, 98 and 100 are used for spacing rather than etching depressions into the substrate layers. FIG. 9 shows suspended diaphragm pressure sensor 102 in which the upper and lower diaphragm layers are not etched to form the diaphragm cavity, but rather are oil filled to separate the diaphragms. Additionally, the upper and lower substrates are etched. FIG. 10 shows suspended diaphragm pressure sensor 104 in which the diaphragm cavity is under-filled with oil. This allows the pressure sensor to operate over a different range of pressures.

Deflection of the suspended diaphragms in the present invention is related to applied pressure, either differential or absolute. By detecting this deformation, it is possible to determine pressure. This detection can be measured through any suitable means. In a preferred embodiment, diaphragm deformation is detected by measuring the change in capacitance between two plates of a capacitor, one carried on each of the diaphragms. FIG. 11 is a cross-sectional view of a suspended diaphragm assembly 108 including upper diaphragm 110 and lower diaphragm 112 which carry upper capacitive plate 114 and lower capacitive plate 116, respectively. Plates 114 and 116 are mounted to diaphragms 110 and 112 through insulating layers 118 and 120, respectively. The region between diaphragms 110 and 112 form cavity 122 which is preferably oil filled.

FIG. 11 shows capacitance CA which is the capacitance between plates 114 and 116. The value of capacitance CA is related to the pressure applied to suspended diaphragm assembly 108. Therefore, by measuring this capacitance, pressure can be determined. However, stray capacitance CS1 and CS2 interfere with this measurement. This capacitance is due to the capacitance between plate 114 and diaphragm 110, and plate 116 and diaphragm 112, respectively. This capacitance arises because insulation layers 118 and 120 separate plates 114 and 116 from diaphragms 110 and 112, respectively. Therefore, it is desirable to eliminate the stray capacitance from the measurement of CA.

FIG. 12 shows circuitry 124 to eliminate interference in the measurement of CA due to CS1 and CS2. Circuitry 124 includes square wave driver 130 coupled to a driven side of capacitor CA. One side of capacitor CS1 (i.e. substrate 110) is coupled to electrical ground as is one side of CS2 (i.e. substrate 112). A sense side of capacitor CA is coupled to the negative input of opamp 132. Opamp 132 is connected with negative feedback through integrating capacitor 134. The non-inverting input to opamp 132 provides a virtual ground. The output of opamp 132 is provided to capacitive measurement circuitry which is used to calculate pressure.

Circuitry 124 keeps substrate 110 and substrate 112 at the "same potential" as the sense electrode 116. This is because sense electrode 116 is held at virtual ground by opamp 132 having negative feedback. This reduces the errors in pressure measurements due to stray capacitance because CS2 is not measured by the circuitry connected to electrode 116.

The invention is a suspended diaphragm pressure sensor well suited for batch fabrication, and having improved stress isolation. A relatively small charge of oil in the diaphragm cavity is required which provides improved accuracy. Further, the structure provides its own over-pressure protection in that if a large pressure is applied, the diaphragms collapse together. The invention provides a three-dimensional structure which is batch fabricated from planar materials.

Although the present invention has been described with reference to preferred embodiments, workers skilled in the art will recognize that changes may be made in form and detail without departing from the spirit and scope of the invention. For example, the tab that supports the diaphragm assembly could be split into a number of closely spaced tabs. Furthermore, the diaphragm assemblies can be made out of sapphire. Sapphire also reduces stray capacitance in comparison to semiconductors because it is less conductive. Additionally, a single diaphragm can move relative to a fixed substrate to measure pressure.

What is claimed is:

1. A pressure sensor, comprising:

a first diaphragm assembly with a diaphragm joined to a substrate along a rim of the diaphragm, the diaphragm and substrate having centers spaced apart from one another to form a first cavity between internal surfaces of the diaphragm and substrate;

inlet means for applying a pressurized fluid to external diaphragm and substrate surfaces which are opposite the internal surfaces;

sensing means disposed on the diaphragm for sensing its deflection and providing an output representative of the fluid pressure; and a mounting block including a tab connected to a first portion of the rim leaving the diaphragm and substrate centers and a second remaining portion of the rim free of further solid mounting.

2. The pressure sensor of claim 1 wherein the mounting block further includes a passageway extending from the cavity through the tab to provide a reference pressure to the cavity.

3. The pressure sensor of claim 1 wherein the tab includes leads for communicating the sensor output.

4. The pressure sensor of claim 1 wherein the diaphragm assembly is formed of a silicon-based material.

5. The pressure sensor of claim 1 wherein the sensing means comprises a capacitor having a first plate coupled to the diaphragm and a second plate coupled to the substrate.

6. The pressure sensor of claim 1 wherein the diaphragm and the substrate are joined to one another by a spacing layer along the rim.

7. The pressure sensor of claim 1 including a second diaphragm assembly having a second cavity in fluid communication with the first cavity wherein size of the first cavity changes inversely to size of the second cavity in response to a differential pressure.

8. The pressure sensor of claim 1 wherein the sensing means comprises a strain gage.

9. The pressure sensor of claim 1 wherein the substrate comprises a second diaphragm.

10. A differential pressure sensor comprising:
a first diaphragm assembly having a first diaphragm and a first substrate joined along a rim of the first diaphragm and spaced apart to form a first cavity therebetween;
a second diaphragm assembly having a second diaphragm and a second substrate joined along a rim of the diaphragm and spaced apart to form a second cavity therebetween;
first inlet means for applying fluid to external surfaces of the first diaphragm assembly;
second inlet means for applying fluid to external surfaces of the second diaphragm assembly;
a support structure including a first tab connected to the rim of the first diaphragm assembly and a second tab connected to the rim of the second diaphragm assembly, the first and second tabs coupled together and in fluid communication with the first and second cavities whereby volume change of the first cavity is inversely related to volume change of the second cavity; and
sensing means coupled to the first diaphragm assembly for sensing diaphragm deflection and providing an output representative of fluid pressure.

11. The differential pressure sensor of claim 10 wherein the support structure further includes a passageway extending from the cavities through the tabs to provide a reference pressure to the cavities.

12. The differential pressure sensor of claim 10 wherein the at least one of tabs include leads for communicating the sensor output.

13. The differential pressure sensor of claim 10 where the first and second diaphragm assemblies are formed of a silicon-based material.

14. The differential pressure sensor of claim 10 wherein the sensing means comprises a capacitor having a first plate coupled to the diaphragms and a second plate coupled to the substrates.

15. The differential pressure sensor of claim 10 wherein the diaphragm and the substrate of the first and second diaphragm assemblies are joined by a spacing layer.

16. The differential pressure sensor of claim 10 wherein the sensing means comprises a strain gage.

17. The differential pressure sensor of claim 10 wherein the substrates of the first and second diaphragm assemblies comprise diaphragms.

18. An apparatus for measuring pressure of a process fluid, comprising:
a sensor body formed of a brittle, corrosion-resistant material, the sensor body responsive to the pressure of the process fluid;
a support;
a sensing element carried by the sensor body responsive to deformation of the sensor body; and
an elongated stress isolator extending between the support and the sensor body and formed of the same material as the sensor body, the isolator including a conduit for carrying an electrical conductor coupled to the sensing element.

19. The apparatus of claim 18 wherein the sensor body comprises a diaphragm assembly with a diaphragm joined to a substrate along a rim of the diaphragm, the diaphragm and substrate spaced apart from one another to form a cavity between them.

20. The apparatus of claim 18 wherein the support is formed of the same material as the sensor body.

21. The apparatus of claim 18 wherein the sensing element is a variable capacitor.

22. The apparatus of claim 18 wherein the support, sensor body and stress isolator are formed by substantially planar substrates bonded together.

23. The apparatus of claim 18 wherein the conduit provides fluid communication between the sensor body and the support.

24. The apparatus of claim 18 wherein the sensor body comprises a first diaphragm and a second diaphragm bonded together along rims of the first and second diaphragm and forming a cavity therebetween.

25. The apparatus of claim 18 including an enclosure surrounding the sensor body and elongated stress isolator which receives the pressure of the process fluid.

26. The apparatus of claim 25 wherein the enclosure, support and elongated stress isolator are formed from two substantially planar substrates bonded together.

* * * * *

UNITED STATES PATENT AND TRADEMARK OFFICE
CERTIFICATE OF CORRECTION

PATENT NO. : 5,483,834
DATED : January 16, 1996
INVENTOR(S) : Roger L. Frick

It is certified that error appears in the above-indentified patent and that said Letters Patent is hereby corrected as shown below:

Col. 7, line 7, after "rim of the" insert --second--.

Signed and Sealed this

Eleventh Day of March, 1997

Attest:

BRUCE LEHMAN

*Attesting Officer*  *Commissioner of Patents and Trademarks*